UNITED STATES PATENT OFFICE.

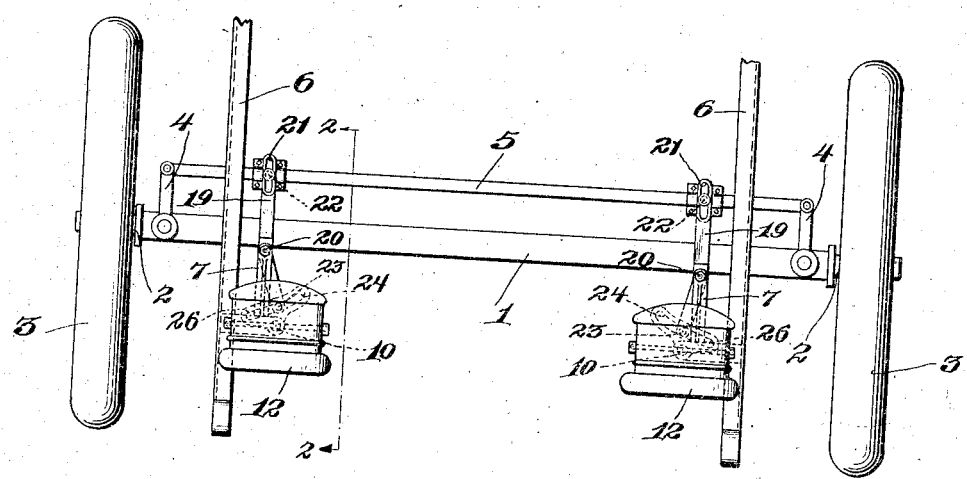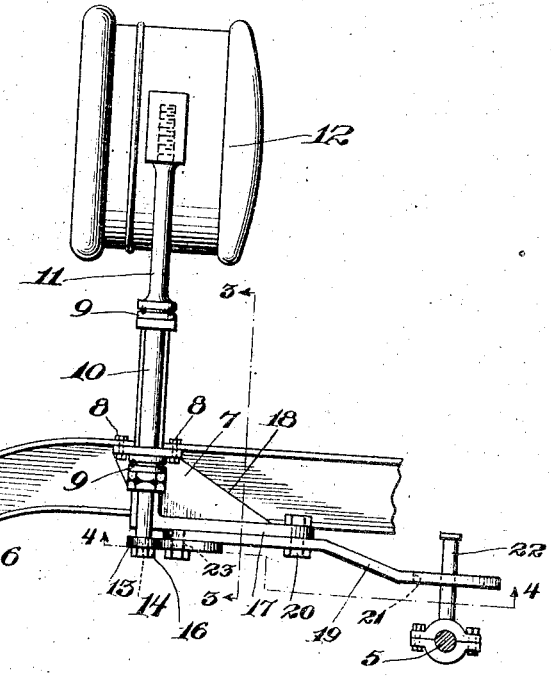

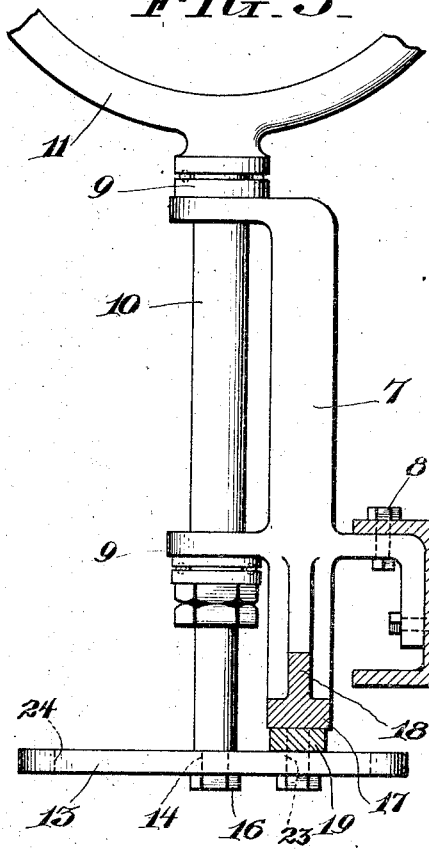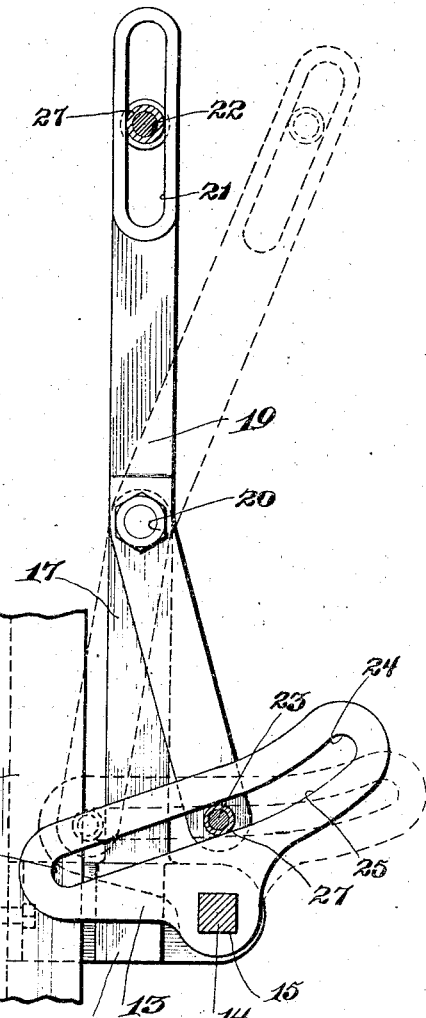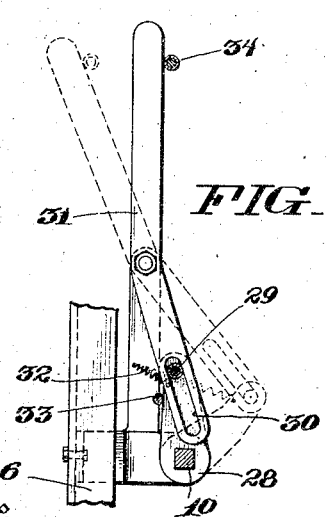

GEORGE W. HOFFMAN, OF MILLVILLE, AND ELLSWORTH HOFFMAN, OF LEESBURG, NEW JERSEY.

HEADLIGHT-OPERATING MECHANISM.

1,172,361. Specification of Letters Patent. Patented Feb. 22, 1916.

Application filed November 23, 1915. Serial No. 62,942.

*To all whom it may concern:*

Be it known that we, GEORGE W. HOFFMAN and ELLSWORTH HOFFMAN, citizens of the United States, residing, respectively, at Millville, county of Cumberland, and State of New Jersey, and Leesburg, county of Cumberland, and State of New Jersey, have invented certain new and useful Improvements in Headlight-Operating Mechanisms, of which the following is a specification.

Our invention relates to improvements in head light operating mechanisms, and more particularly for such mechanism as applied to the head lights of automobiles which compel one of the lights to turn in the direction the vehicle is turning, the object of the invention being to provide improved means operated by and in conjunction with the steering mechanism so as to compel the movement of the lamps.

A further object is to provide improvements of the character stated which can be manufactured and placed on the market at a reasonably low price, which are capable of use in connection with any ordinary steering mechanism, and which will most efficiently perform the functions for which they are intended.

With these and other objects in view, the invention consists in certain novel features of construction and combinations and arrangement of parts as will be more fully hereinafter described and pointed out in the claims.

In the accompanying drawings: Figure 1 is a top plan view illustrating our improvements. Fig. 2 is a view in section on an enlarged scale on the line 2—2 of Fig. 1. Fig. 3 is a view in section on an enlarged scale on the line 3—3 of Fig. 2. Fig. 4 is a view in section on an enlarged scale taken on the staggered line 4—4 of Fig. 2, and Fig. 5 is a view similar to Fig. 4 on a reduced scale illustrating a modification.

1 represents a front axle of an automobile, having the ordinary pivoted stubs 2 at its ends, mounted in the wheels 3, and provided with crank arms 4 connected to the steering rod 5, so that the movement of the steering rod causes the angular position of the wheels as is well understood.

The parts above described are common in automobile construction, and any suitable means may be employed for moving the rod 5.

6, 6, are the ordinary frame bars to which brackets 7 are secured by bolts 8. The brackets 7 have alined bearings 9 for the vertical shafts 10 of the lamp brackets 11. The lamp brackets are of the ordinary type and support at their upper ends, the ordinary head lights or lamps 12.

On the extreme lower ends of the shafts 10 of lamp brackets 11, cams 13 are secured. The preferable manner of connecting the cams is to make portions of the shafts 10 angular as shown at 14, project the angular portions 14 through angular openings 15 in the cams, and then on the extreme ends of the shafts 10, provide nuts 16 to clamp the parts together.

The brackets 7 above referred to have horizontal extensions 17 thereon strengthened by webs 18 and levers 19 are fulcrumed between their ends on bolts 20, the latter secured to the arms 17. The rear ends of the levers 19 have longitudinal slots 21 therein to receive the pins 22 on the steering rod 5. The forward ends of the levers 19 are provided with pins 23 which project through slots 24 in the cams 13. These slots 24 are at one end curved in the arc of a circle concentric with the pivot bolt 20 as shown at 25, so that the lever can swing from a central position of the cam to one end and back without moving the cam in the slightest. The other end or half of the slot 24 is relatively straight as shown at 26, so that when the lever swings in the opposite direction, the pin 23 will exert a pressure on the wall of the slot so as to compel the cam to move and turn the shaft 10 and lamp bracket 11.

The levers 19 are angle levers and are oppositely positioned. The cams 13 are also oppositely positioned relative to each other, so that while the movement of the steering rod in one direction will compel one of the cams to move, such movement will not be imparted to the other cam by reason of the curved portion 25 of slot 24.

The pins 22 and 23 are preferably provided with tubular rollers 27 to reduce friction to a minimum.

With the parts as illustrated in Fig. 1, if the rod 5 is moved to the right, the right hand lever 19 will swing idly as its pin 23 will ride in the curved portion 25 of slot 24 of the right cam 13. The lever 19 at the left will cause the movement of the cam by reason of the fact that its pin 23 will ride in the straight portion 26 of slot 24 of the left hand cam 13, hence the lamp 12 at the left will be turned at the same angle as the wheels 3 are turned. This will result in the light being thrown in the same direction the vehicle is turning, while the other lamp will continue to throw the light straight ahead, and the entire road surface and area will be illuminated to avoid accidents which might otherwise occur.

It will be noted that with our improvements, one lamp turns with the wheels while the other remains straight, and that the lamp on the side of the vehicle nearest the turn is the lamp which will always move, while the other lamp farthest from the turn will remain straight.

In Fig. 5, we illustrate a modification, and in this form of our invention, we dispense with the cam 13 and provide on the lamp bracket shaft 10, a crank arm 28 having a pin 29 thereon located in a slot 30 in the lever 31. This lever 31 corresponds to the lever 19 of the preferred form. A spring 32 connects the lever with the extension 17 holding the parts in normal position with the crank arm 28 against a stop pin 33. 34 is a pin corresponding to pin 22 of the preferred form. In this modification, the pin 34 engages one side of the lever 31, so that the movement of the steering rod in one direction causes the pivotal movement of the lever, but in the other direction of movement, the pin 34 simply moves away from the lever and does not operate the same.

Various slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention, what we claim as new and desire to secure by Letters Patent is:

1. The combination with a vehicle frame, an axle supporting the same, wheels on the axle, and a transversely positioned steering rod for moving the wheels at an angle to the axle, of lamp brackets vertically positioned and having rotary mounting on the frame, levers pivotally supported between their ends and adapted to be moved by the steering rod, and members secured to turn with the brackets and having slot and pin connection with the levers, whereby the movement of the levers causes the movement of the brackets in one direction only, substantially as described.

2. The combination with a vehicle frame, an axle supporting the same, wheels on the axle, and a transversely positioned steering rod for moving the wheels at an angle to the axle, of lamp brackets vertically positioned and having rotary mounting on the frame, levers pivotally supported between their ends and adapted to be moved by the steering rod, cams secured to the brackets and having slots therein, pins on the levers in the slots, said slots throughout one-half of their length curved concentric with the pivots of the levers, substantially as described.

3. The combination with a vehicle frame, an axle supporting the same, wheels on the axle, and a transversely positioned steering rod for moving the wheels at an angle to the axle, of lamp brackets vertically positioned and having rotary mounting on the frame, levers pivotally supported between their ends and adapted to be moved by the steering rod, cams secured to turn with the brackets and having slots therein, pins on the levers located in the slots, the slots in the respective cams curved concentric with the pivots of the levers throughout one-half of their length, and the cam of one bracket located reversely to the cam of the other bracket, substantially as described.

4. The combination with a vehicle frame, an axle supporting the same, wheels on the axle, and a transversely positioned steering rod for moving the wheels at an angle to the axle, of brackets secured to the frame and having extensions thereon, lamp brackets having rotary mounting in the first-mentioned brackets, cams secured to the lower ends of the lamp brackets, levers pivotally connected to the extensions and having slots at one end, pins on the steering rod projected through the slots in the levers, said cams having slots therein, curved throughout one-half of their length concentric with the pivots of the levers, and straight throughout their other portions of their length, and pins on the levers located in the slots, substantially as described.

In testimony whereof we have signed our names to this specification in the presence of two subscribing witnesses.

GEORGE W. HOFFMAN.
ELLSWORTH HOFFMAN.

Witnesses:
C. E. ROTH,
MARIE JACKSON.